UNITED STATES PATENT OFFICE.

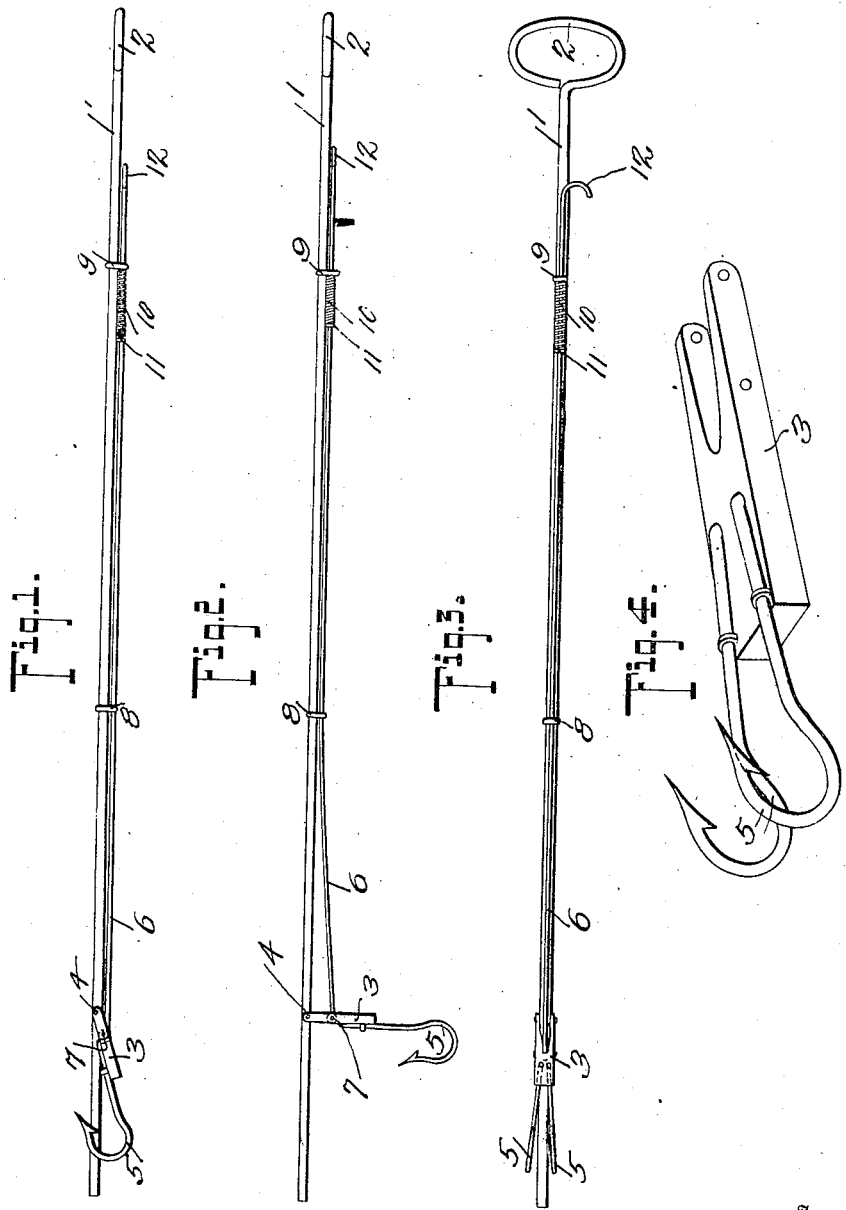

REUBEN J. HOWSE, OF HUGO, OKLAHOMA.

FISHING DEVICE.

1,055,748.

Specification of Letters Patent. Patented Mar. 11, 1913.

Application filed June 1, 1912. Serial No. 701,042.

*To all whom it may concern:*

Be it known that I, REUBEN J. HOWSE, a citizen of the United States, residing at Hugo, in the county of Choctaw and State of Oklahoma, have invented certain new and useful Improvements in Fishing Devices, of which the following is a specification.

The present invention relates to a device for catching fish, and has particular reference to such a device embodying a hook-staff upon which are movably mounted in a novel manner a number of bait-hooks, so arranged that they are highly reliable in catching the fish when the latter strikes or bites.

An important object of the invention is to provide a device of the above mentioned character, having novel means for removing the bait-hook from the flesh of the fish in a quick and easy manner.

A further object is to provide a device of the above character, which will securely hold the fish in order to prevent its escape before being landed.

For a full understanding of the present invention, reference is to be had to the following description and to the accompanying drawings, in which—

Figure 1 is a side elevation of the device, with the bait-hooks in their closed or operative position; Fig. 2 is a similar view showing the bait-hooks in their open position; Fig. 3 is a bottom plan view of the device; and Fig. 4 is an enlarged detail perspective view of the bait-hooks and their support.

Throughout the following detail description and on the several figures of the drawings, similar parts are referred to by like reference characters.

Referring particularly to the drawings, the numeral 1 designates a hook-staff having one end looped or provided with an eye 2 for connection with a fishing line, (not shown).

Disposed near and spaced from the free lower end of the hook-staff 1 is a swinging support, or arm 3, having one end forked, as shown, to straddle the hook-staff and be pivotally connected therewith by means of a pin 4, or the like. Rigidly attached to the outer or free end of the support 3 are a plurality of bait-hooks 5, the same being of any well known or preferred form. In the drawings there are two of the bait-hooks shown, which are spaced so as to be disposed upon opposite sides of the hook-staff 1. When the bait-hooks are in their closed position, the hook-staff 1 extends downwardly beyond the same, as shown.

The pivoted support or arm 3 is held in its closed position by a reciprocatory rod 6 having a pivoted connection therewith, as indicated at 7. This rod 6 is flexible to a suitable degree, and passes through guide rings 8 and 9, which latter are fixed upon the hook-staff 1. Surrounding the rod 6 is a compressible coiled spring 10, confined between the guide ring 9 and a ring 11, which latter is fixed upon the rod 6. The rod 6 has its upper end bent to form a hook portion 12, as is particularly shown in Fig. 3, which is to be engaged for moving the rod in opposition to the spring 10.

In the use of the device, the bait-hooks 5 may be moved to their open position to receive the bait, subsequently to which they are released and are automatically returned to their closed position by means of the spring 10 and associated elements. The hook-staff 1 extends down beyond the bait hooks 5, so that it enters the mouth of the fish when he swallows the bait-hooks. These bait-hooks penetrate the flesh of the fish and securely hold him until he has been landed. To remove the hooks from the flesh of the fish, the rod 6 is moved longitudinally in opposition to the spring 10, thus moving the pointed ends of the bait-hooks away from the hook-staff and hence freeing them from the flesh of the fish, which flesh is held by the hook-staff from moving with the bait-hooks.

It is to be understood that the form of my invention illustrated is to be considered as a preferred embodiment of the same, and that certain changes in the shape and arrangement of the parts may be resorted to without departing from the spirit of the invention, as covered in the sub-joined claims.

Having thus described the invention, what is claimed as new is:

1. A fishing device of the character described, comprising a hook-staff, a support pivotally connected with the hook-staff, spaced bait-hooks carried by the support to be disposed upon opposite sides of the hook-staff when the support is in its closed position, and means to swing the support with relation to the hook-staff.

2. A device of the character described, comprising a swinging support having its inner end forked, spaced bait-hooks rigidly mounted on the free end of the support, a hook-staff having one end extending downwardly below the bait-hooks and being disposed in the forked end of the support and pivoted therewith, guides fixed on the hook-staff, a rod mounted in said guides and pivoted with the support, and a compressible coiled spring carried by the rod and engaging one of the fixed guides.

In testimony whereof I affix my signature in presence of two witnesses.

REUBEN J. HOWSE.

Witnesses:
H. J. KELLER,
L. C. THOMASON.